UNITED STATES PATENT OFFICE.

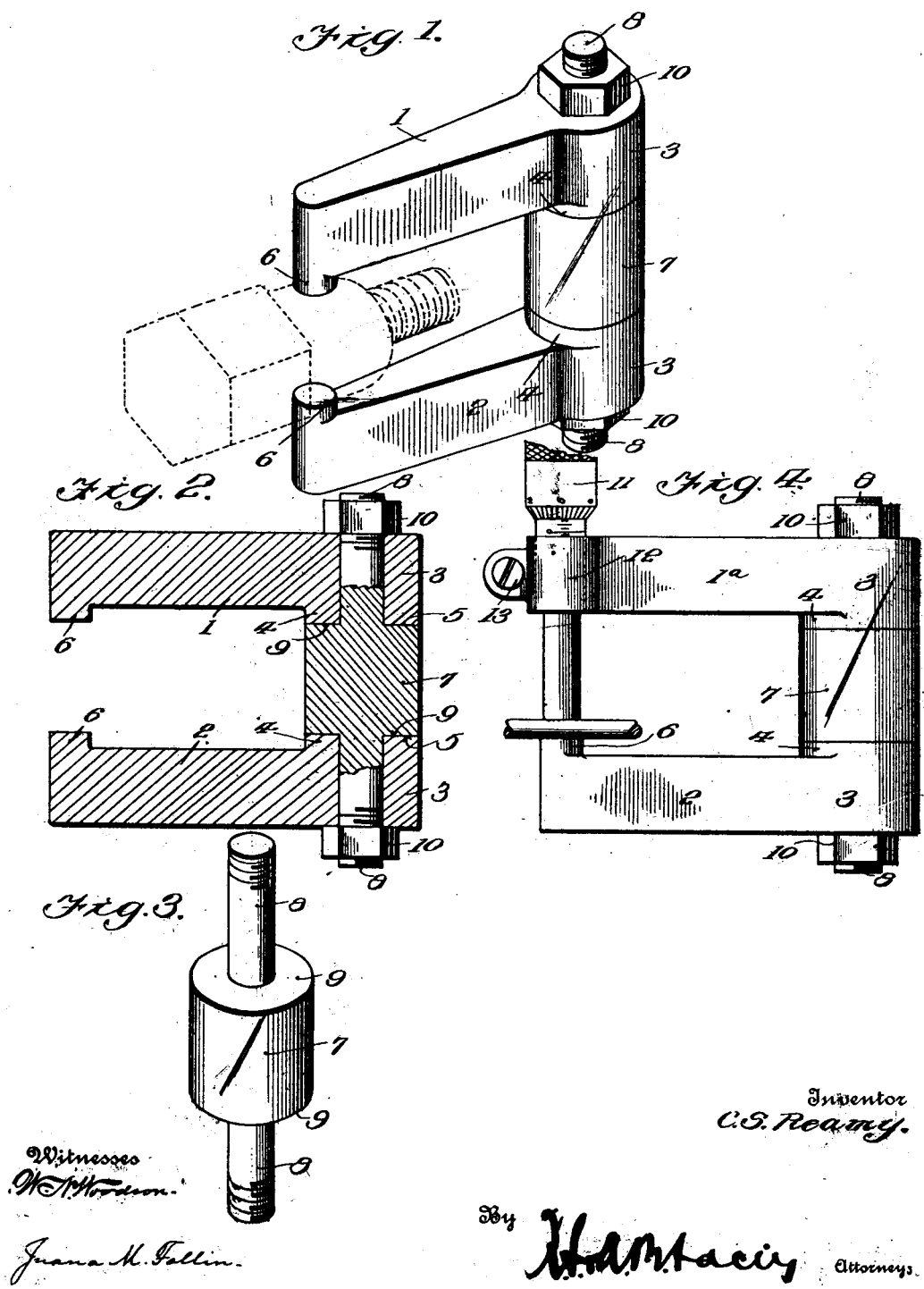

CHRISTOPHER S. REAMY, OF WALTHAM, MASSACHUSETTS.

COMBINATION HEIGHT AND CALIPER GAGE.

1,033,346.  Specification of Letters Patent.  Patented July 23, 1912.

Application filed April 3, 1911. Serial No. 618,621.

*To all whom it may concern:*

Be it known that I, CHRISTOPHER S. REAMY, citizen of the United States, residing at Waltham, in the county of Middlesex and State of Massachusetts, have invented certain new and useful Improvements in Combination Height and Caliper Gages, of which the following is a specification.

The present invention comprehends certain new and useful improvements in measuring instruments for use in machine shops and the like, and the invention relates more particularly to instruments of that type known as "snap gages."

The snap gage in ordinary use consists of a single bar of metal which is substantially C-shape in form and has its ends spaced apart at some predetermined distance, the objects to be tested being placed between the said ends of the bar to ascertain whether or not they are of precisely correct size. Of course the ends of the bar are soon worn away by repeated use, and the entire instrument must then be discarded since its accuracy is destroyed. This is manifestly quite objectionable, as the instruments are expensive and their term of service is comparatively short.

The object of the present invention is to obviate the objection above noted and to provide an improved instrument of this character which is capable of being conveniently trued, when necessary, to compensate for wear.

For a full understanding of the invention, reference is to be had to the following description and accompanying drawings in which:

Figure 1 is a perspective view of a snap gage constructed in accordance with my invention; Fig. 2 is a longitudinal section thereof; Fig. 3 is a detail perspective view of the spacing member detached; Fig. 4 shows the instrument equipped with another form of gage arm carrying a micrometer head.

Corresponding and like parts are referred to in the following description and indicated in all the views of the accompanying drawings by the same reference characters.

My improved measuring instrument includes a pair of separate gage arms which are designated 1 and 2 respectively. As the arms are substantial duplicates only one of the same will be specifically described. The arm is formed at one end with an integral sleeve 3 which is substantially cylindrical in form and extends transversely with respect to the arm. One end of the sleeve projects slightly laterally beyond one side of the arm, as indicated at 4. The terminal face of said projecting end of the sleeve is ground smooth and true to constitute an annular bearing surface 5 which lies in a plane perpendicular to the axis of the bore of the sleeve. A nib 6 is formed integral with the other end of the arm and projects laterally on the same side thereof as the sleeve, the terminal face of the nib being flat and lying in the same plane as the bearing surface 5.

The gage arms are connected together through the medium of a spacing member 7 which is interposed between the laterally projecting ends of the sleeves 3. The member is formed of solid metal and has a substantially cylindrical periphery which is preferably of the same diameter as the external diameter of the sleeves. The gage arms may be secured to the spacing member in any approved manner, as for instance, by means of threaded studs 8 that extend axially from the ends of the member and fit in and project through the sleeves. The studs are of smaller diameter than the spacing member in order to provide annular shoulders 9 at both ends of the member. The shoulders are ground smooth and true and lie in planes perpendicular to the longitudinal axis of the member. These shoulders must be very carefully formed so as to be spaced apart a predetermined distance say, for instance, precisely one inch. Nuts 10 are screwed on the projecting extremities of the threaded studs 8 and are tightened against the sleeves to retain the arms on the studs and to hold the bearing surfaces 5 firmly against the adjacent shoulders 9. As the terminal faces of the nibs 6 lie in the same plane with the respective bearing surfaces 5, said nibs are held apart a distance exactly equal to the length of the spacing member. Hence the instrument may be employed in the usual manner for testing parts of machines and other objects to ascertain whether or not they are of precisely the correct size.

In practice, the arms may be quickly detached from the spacing member and applied to another spacing member of a different length. It is contemplated to provide a set of spacing members of different standard sizes, with each measuring instrument, the said members being interchangeable so that the gage arms may be held apart at any desired distance. Of course, after repeated use of the instrument the terminal faces of the nibs 6 will become worn away. However, this does not necessitate discarding the instrument, since the arms may be detached from position and readily re-ground so that the terminal faces of the nibs and the corresponding bearing surfaces 5 lie in the same plane. In this manner the defect may be easily and cheaply corrected, the wear compensated for, and the instrument rendered ready again for use.

As shown in Fig. 4, the gage arm 1ª may be formed at its outer end with a spring clip in lieu of a laterally projecting nib. The clip supports a conventional micrometer head 11 so that the spindle of the micrometer is disposed in alinement with and is adjustable toward and away from the nib of the gage arm 2. The clip consists of a split sleeve 12 which receives the barrel of the micrometer, a screw 13 being arranged to draw the portions of the sleeve together to clamp the micrometer rigidly in position. This form of the instrument will be found particularly convenient where fine measurements are required.

What I claim is:

A gage including a spacing member of predetermined length, a gage arm projecting laterally from the member and formed with a nib projecting angularly on one side of the arm and having a flat terminal face, a sleeve provided on the arm and extended beyond the same side thereof as the nib, the extended portion of the sleeve having a flat terminal bearing surface abutting against one end of the spacing member and lying in the plane of the terminal face of the nib, and fastening means passing through the sleeve and detachably securing the arm to the spacing member.

In testimony whereof, I affix my signature in presence of two witnesses.

CHRISTOPHER S. REAMY. [L. S.]

Witnesses:
F. J. MAURER,
H. STANLEY BAILEY.